United States Patent [19]
Duveau

[11] 3,970,413
[45] July 20, 1976

[54] FLUID DISTRIBUTION APPARATUS AND METHOD

[76] Inventor: François Duveau, 74 Rue Michel Ange, Paris 16°, France

[22] Filed: Dec. 10, 1973

[21] Appl. No.: 423,090

Related U.S. Application Data

[63] Continuation-in-part of Ser. No. 219,966, Jan. 24, 1972, abandoned.

[52] U.S. Cl. .................................. 417/7; 417/12; 417/315; 418/32
[51] Int. Cl.² .................. F04B 41/06; F04B 19/00; F04B 37/00
[58] Field of Search ............. 417/2, 3, 4, 5, 6, 7, 417/8, 315, 12; 418/32; 415/213 T, 97; 60/486

[56] References Cited
UNITED STATES PATENTS

| | | | |
|---|---|---|---|
| 2,960,828 | 11/1960 | Gould | 60/486 |
| 3,060,858 | 10/1962 | Shoosmith | 417/3 |
| 3,195,555 | 7/1965 | Schaub | 417/7 |
| 3,301,188 | 1/1967 | Belonger | 415/97 |
| 3,374,744 | 3/1968 | Toma | 415/213 T |
| 3,726,607 | 4/1973 | Garman | 417/12 |

*Primary Examiner*—William L. Freeh
*Assistant Examiner*—G. P. LaPointe

[57] ABSTRACT

Systems for delivering fluid at substantially constant pressure to consuming loads which exhibit widely varying demands. The systems employ parallel connected booster pumps which may be operated in either of two rotational directions to provide two output flow rates for each pump.

8 Claims, 4 Drawing Figures

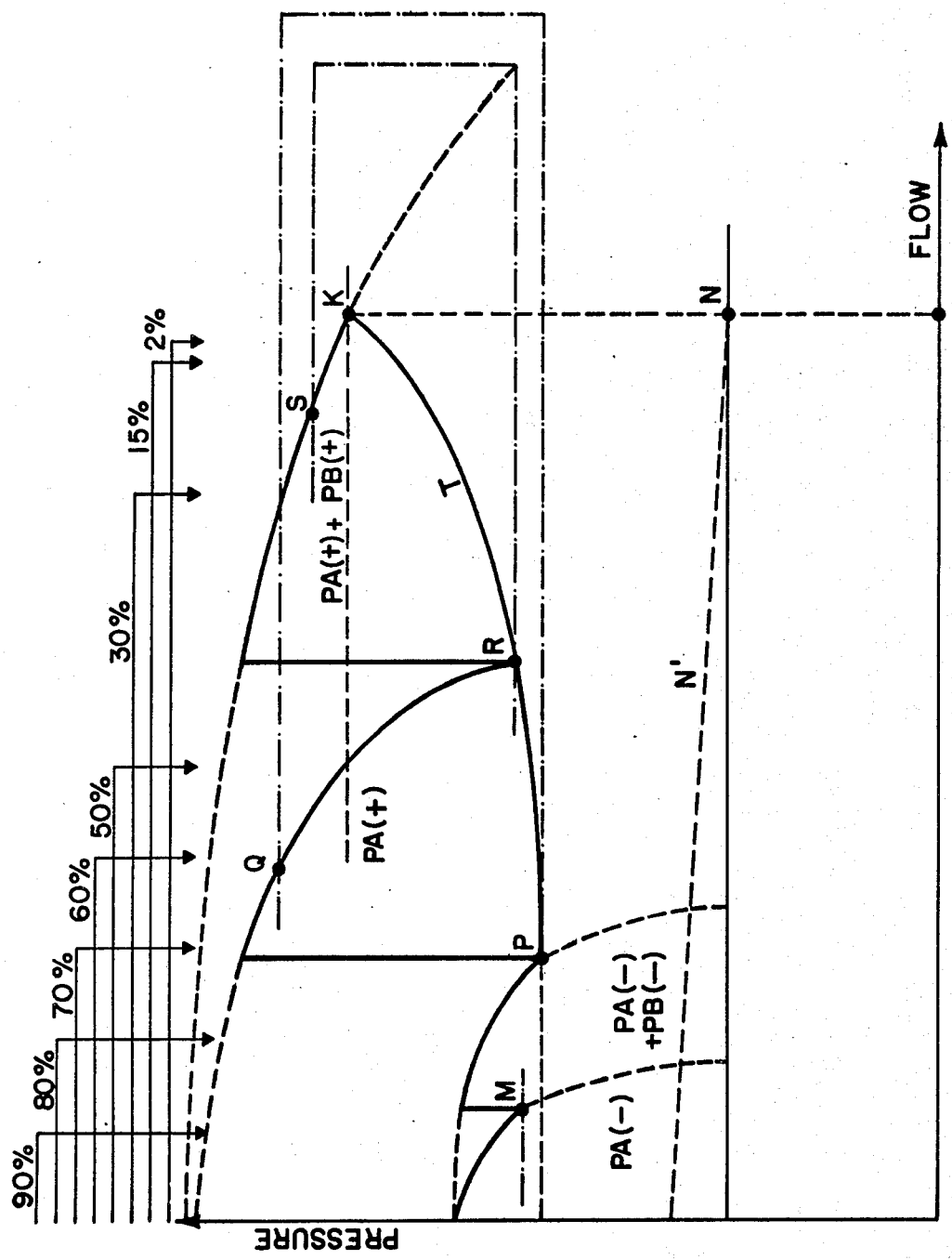

FLUID DISTRIBUTION APPARATUS AND METHOD

CROSS-REFERENCE TO RELATED APPLICATIONS

This application is a continuation-in-part of application Ser. No. 219,966 filed Jan. 24, 1972 now abandoned.

BACKGROUND OF THE INVENTION

1. Field of the Invention

The present invention is directed to pressure boosters for fluid distribution circuits and to hydraulic distribution circuits incorporating such boosters. More specifically, this invention relates to the enhancement of the flow and pressure characteristics of fluid distribution circuits. Accordingly, the general objects of the present invention are to provide novel and improved apparatus and methods of such character.

2. Description of the Prior Art

While not limited thereto in its utility, the present invention is particularly well suited to use in or as a fluid supply circuit connected to a general water distribution system wherein the flow demands can vary between rather extreme limits. An example of such a system would be a complex of living units where it is necessary to satisfy peak demands for water while simultaneously preventing the pressure from dropping below a predetermined value. Similar problems are presented in, and the present invention is also applicable to, air distribution systems such as ventilation circuits incorporating fans or blowers.

Problems of the type alluded to above have, in the case of hydraulic distribution circuits, previously been solved through the use of hydro-pneumatic pressure booster systems wherein one or more centrifugal pumps were controlled in an on-off fashion. Such prior art systems typically employ an elastic cushion, defined by a pressurized vessel containing a quantity of air, and the volume variations between two predetermined pressures are measured and used to determine the operating cycle of the pump or pumps. Such prior art hydro-pneumatic pressure booster systems have been characterized by relatively high maintenance costs due, in part, to the necessity of periodically reinflating the air cushion; such reinflation being necessitated by micro-leaks or by natural dissolution of the air in water.

In the interest of reducing the size and complexity of pressure booster systems in hydraulic distribution circuits, and also in reducing maintenance requirements and power consumption, it has been proposed to employ permanently operating pressure maintenance pumps. The use of such continuously operating pumps enables elimination of the pressurized vessel since the pump pressure head is added to the pressure of the system. At first glance this would appear to insure adequate pressure in the fluid distribution circuit. However, systems employing continuously operating pressure maintenance pumps have encountered difficulties in insuring peak flows. The provision of grossly oversized pumps to insure adequate peak flows is not an economically feasible solution to these difficulties.

Comparative complex control systems employing both continuously and intermittently operated booster pumps have also been proposed in hydraulic distribution circuits of the type being discussed for purposes of explanation. In such systems there has typically been a functional disparity in size between the continuously operating units and the peak load supplying units and such functional disparities have imposed additional complications on the systems.

A further prior art attempts at solving peak flow problems in hydraulic circuits has envisioned varying the speed of the booster pumps either continuously or in stages. This approach has, however, resulted in extremely complex and expensive systems. This complexity results from the fact that the flow delivered by an electric motor drive centrifugal pump varies with speed thereby making it difficult to multiply the flow provided by a group of such pumps by three or four times as may be encountered during peak load periods. Additionally, adding to system complexity and thus lack of reliability, is the fact that pump compression level varies with the square of pump speed. As a further complication, the power required to drive such pumps also varies in a ratio of the cube of the speed.

SUMMARY OF THE INVENTION

The present invention overcomes the above briefly described and other deficiencies and disadvantages of the prior art by providing a novel pressure booster system and a fluid flow distribution circuit incorporating such booster system. The present invention is based on the fact that it is possible to drive the rotor of any rotary pump in two directions. This inherent possibility has never been exploited because the potential usefulness thereof has not been appreciated and, perhaps more particularly, because the desire for maximum efficiency has led to a sacrifice of pump performance in one of the possible directions of rotation in favor of the other. Nevertheless, pumps are commercially available which will operate with a reasonable degree of efficiency in the "off-design" direction. Consequently, it is possible to employ pumps which may be selectively caused to rotate in either direction giving two different flow rates for each pump and, in a distribution system, giving $2n$ flows per $n$ pumps.

Thus, in accordance with the present invention, one or more pump units, each comprising two pumps having the same characteristics, are employed to provide $2n$ flows by utilizing each pump in both rotational directions. This provides a plurality of pump combinations which, in turn, enables provision of a system having a highly desirable pressure-flow curve.

A particularly advantageous feature of the present invention is that it permits the use of a single reserve pump, if necessary or desired, because all pumps used in the system are identical.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is a graphical presentation depicting operation of the present invention;

DESCRIPTION OF THE PREFERRED EMBODIMENT

Figure 2A:
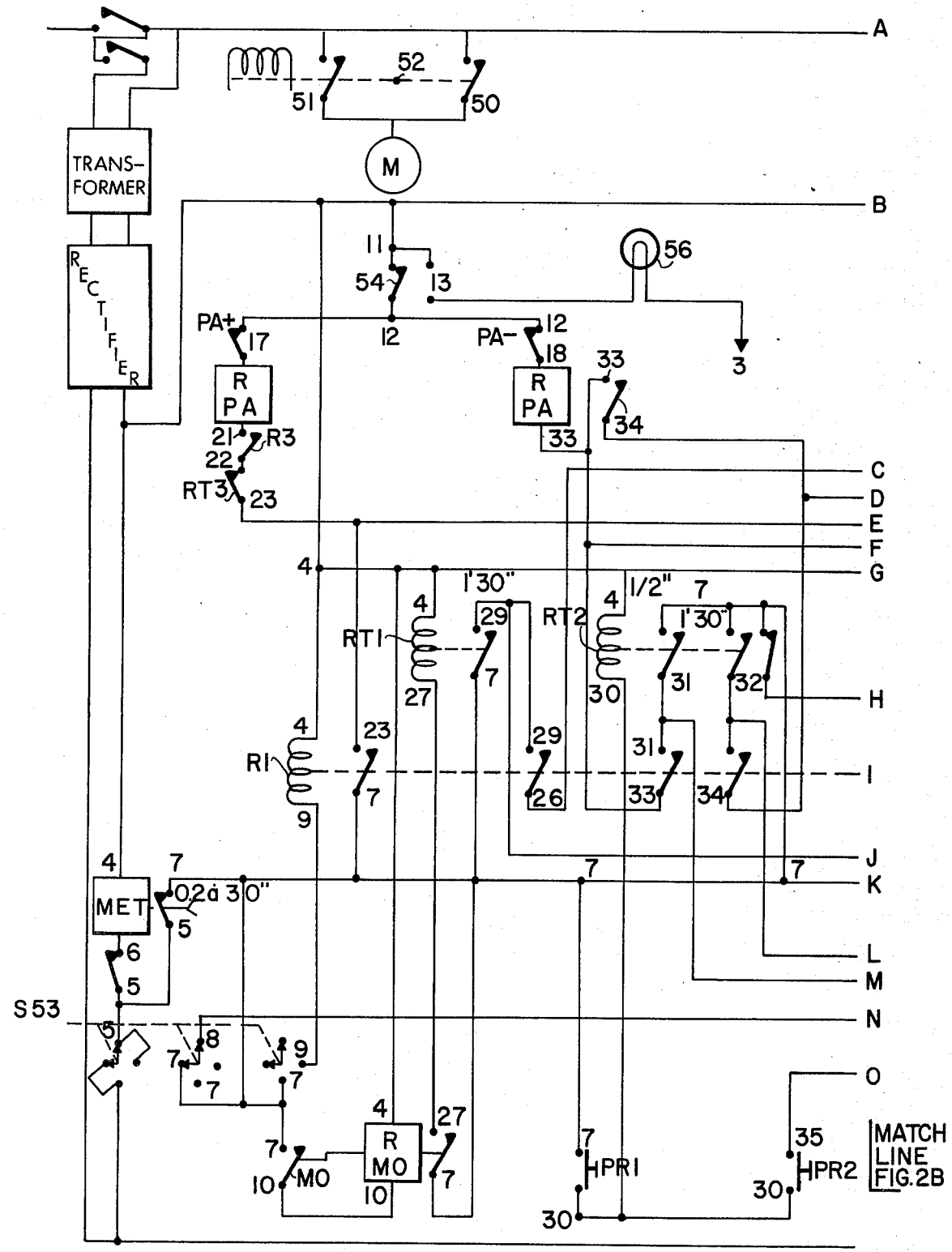
FIG. 2 is a schematic representation of an electrical control circuit for the present invention.

In FIG. 1 the abscissa of the graph represents increasing flow rates while the ordinate indicates increases in pressure. FIG. 1 relates to a group of two pumps, designated PA and PB, with the designations being followed by a (+) or (−) according to whether the pump in question is rotating in the "direct" or "opposite" direction. In the context of this disclosure the direct direction is the direction of highest performance efficiency and is indicated (+) and while the opposite direction is the direction of lowest performance and is indicated by (−). Although better results can be obtained, a typical ratio of the compression levels for a pump, depending whether it turns in the (+) or (−) direction, is about 0.66. It is to be noted that this ratio increases when the pumps have their intake ports connected to a pressurized distribution system. As noted above, bi-directional pumps suitable for use in the present invention are commercially available. Such pumps may, for example, comprise centrifugal pumps.

In FIG. 1 the point N represents the peak flow and pressure guaranteed by the system. It may thus be considered that the solid line parallel to the axis of the flows and passing through the point N represents the theoretical Piezo-metric level of the system although the true curve is shown as broken line N′. Thus, as will become obvious from the discussion below, the ratio of the compression levels for low flows is further improved, a fact which in practice is ignored, and the margin of uncertainty improved with the use of the present invention.

In the selected operating mode, explained below, the following curves are used:

PA(−) — represents operation of pump A only and in the (−) direction;

PA(−) + PB(−) — represents operation of pumps A and B in parallel and both in the (−) direction;

PA(+) — represents operation of pump A only and in the (+) direction;

PA(+) + PB(+) — represents operation of pumps A and B in parallel and in the (+) direction; and T — represents the increase in load losses in the circuit as the flow increases with ideal or theoretical operation.

The actual preferred operating mode is represented by the saw-toothed curve shown as an unbroken line based on the curve T. At the upper part of FIG. 1 portions of a typical cycle, represented in terms of percent of time in a typical 24 hour period, during which the flow probably will be within certain regions have been indicated.

In terms of FIG. 1, the operation of the invention is as follows:

Over the larger portion of the day, indicated as 90% on the diagram, pump PA(−) rotates and supplies the required flow while maintaining circuit pressure at levels up to that corresponding to point M on FIG. 1. As soon as pressure M is reached by the development of the required flow by pump PA the second pump PB(−) will be caused to support pump PA(−) by operating in parallel therewith. If, after a predetermined time, the pressure M is not detected by a pressure sensitive switch 26 (FIG. 2), pump PB(−) will be stopped and only pump PA(−) will continue to rotate. However, if the pressure remains above that of point M, pumps PA(−) + PB(−) will continue to operate in parallel. If, with the pumps operating in parallel in the (−) direction, the system pressure reaches a level corresponding to point P, both the pumps PA(−) and PB(−) will be stopped and pump PA will be restarted in the (+) direction. Pump PA(+) will remain in operation until the pressure reaches that corresponding to point R. Should pressure level R be reached pump PB is started in the (+) direction and thus pump PB(+) supports pump PA(+) by parallel operation. If, after a predetermined time, a pressure corresponding to that of point S is detected, the parallel operation continues until pressure level K is reached. When pressure level K is no longer detected, pump PB(+) will be stopped and the mode of operation with PA(+) alone operating is resumed.

In FIG. 1, the broken lines passing respectively through points M, P and R and parallel to the axis of flow respectively indicate the pressure levels at which pump PB(−) starts operating, pump PA(+) starts operating, and pump PB(+) starts operating. The relative position of these three parallel lines is a consequence of and therefore a characteristic of the operating mode selected as the preferred mode of operation of the invention.

The points Q and S on FIG. 1 correspond to a time delay, after a pump initiation, after which the flow may be considered as momentarily stabilized. The provision of such time delays is in the interest of preventing "pumping" of the device in the vicinity of the peaks of the curve; i.e., the time delays prevent too frequent changes in the system operational mode. The length of the time delays are determined experimentally and depend on the anticipated flow demand changes to be imposed on the delivery circuit.

Taking into account the practical distribution of the high and low flows of the operative period depicted in FIG. 1, which as noted is a 24 hour day, it may be seen that pumps PA and PB operating in the (−) direction will fulfill 70% of the requirements imposed on the system. During the remainder of the time excess pressure on the order of 1 to 3 bars will permit the supply of increasingly high flows. It is to be noted that this pressure range corresponds to a maximum pressure commensurate with that which would have been attained employing the conventional prior art hydropneumatic type boosters for which the regulation range would necessarily have to be entirely above the point K of FIG. 1.

It is also to be noted that, in the above discussed example which relates to an installation with two pumps, it will usually be considered necessary to have a third pump in reserve. The preferred operational mode is to keep the reserve pump continuously operating. With the reserve pump continuously operating the saw-toothed curve of FIG. 1 will have two additional "teeth" which result in the overall curve approaching the ideal response to a closer degree. Obviously, in the three pump system when one pump breaks down the two remaining pumps will continue to provide the peak flow.

Figure 2B:
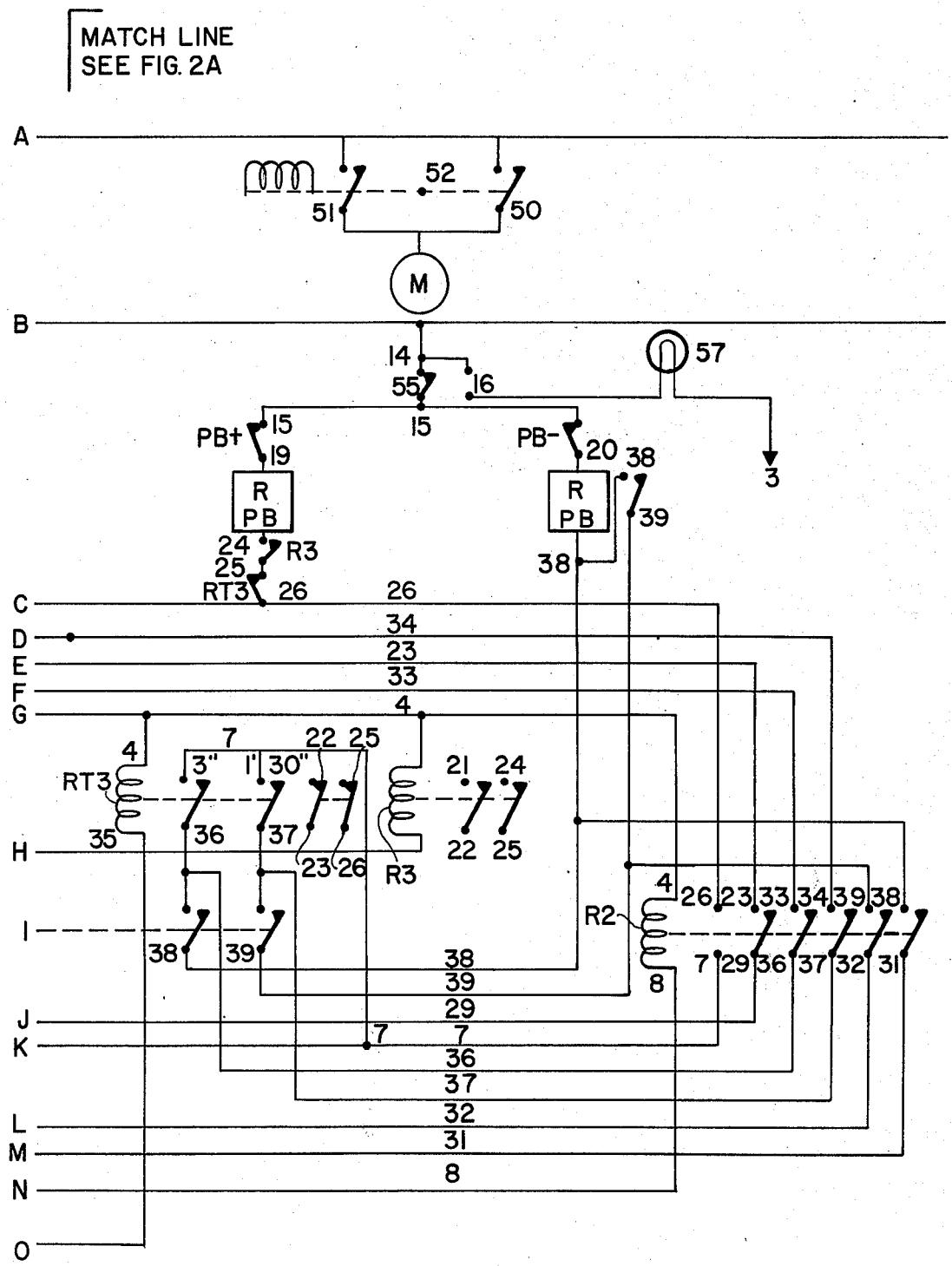

FIG. 2 depicts an electric circuit for control of the distribution system described above in the discussion of FIG. 1. In FIG. 2 the relays of the control circuitry are represented schematically and the same reference characters have been applied to the relay solenoids and the switch contacts controlled thereby. Also, in the interest of facilitating understanding of the invention, several of the switches or terminals have been shown twice in FIG. 2.

Figure 3:
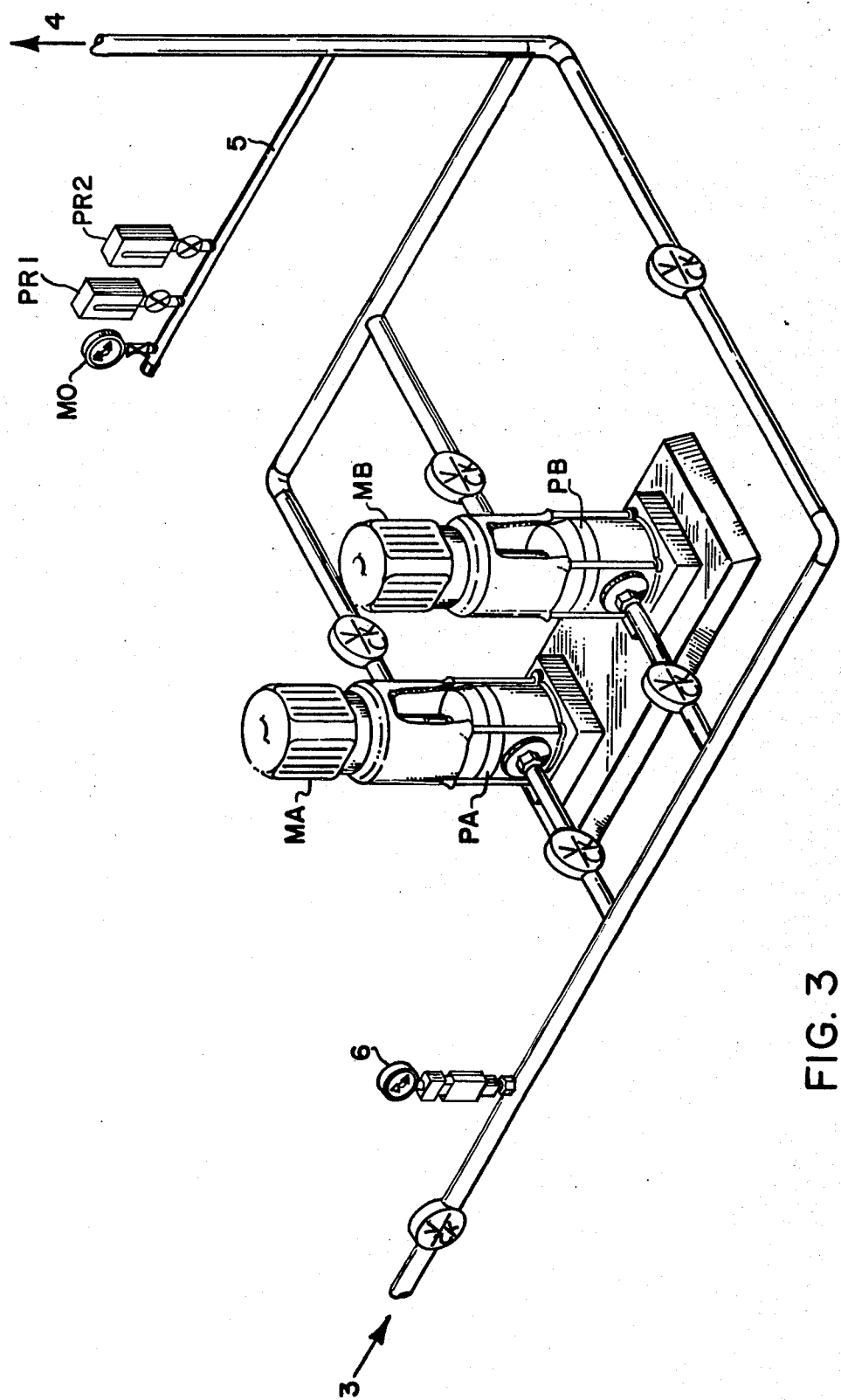
FIG. 3 is a schematic isometric view of a preferred embodiment of the invention which may utilize the control circuitry of FIG. 2.

The drive motors MA and MB respectively for pumps PA and PB may be presumed to be three phase electric motors supplied by three phase alternating current. The alternating current supply will be converted into a low voltage direct current for use in the control circuitry by means of a power supply including a transformer and rectifier. In the hydraulic circuit represented in FIG. 3, the pumps PA and PB are connected in shunt between the supply circuit 3 and the delivery circuit 4. The delivery pressure is sensed by means of pressure sensitive devices MO, PR1 and PR2. The pairs of ganged relay contacts, indicated at 50 and 51 (FIG. 2), are employed to supply lower to pump motors MA and MB. Relay contacts 50 and 51 are mechanically interconnected as indicated schematically at 52.

The control device includes a four position selector switch 53. Switch 53 has two stop positions and two positions which control respectively the excitation of the solenoids or relays of R1 and R2. Relays R1 and R2 supply power for initiating operation of the drive motor MA of priority pump PA and are typical of similar such relays conventionally employed in motor starting circuits. Conventional protective devices, indicated schematically as MET are incorporated in the system to prevent the operation of pump PA when there is no fluid at the pump inlet. As noted above, PR1 and PR2 denote pressure sensitive switches and whereas MO denotes a manometer type device which typically will have two contacts; all of devices PR1, PR2 and MO having a time delay.

Presuming that pump PA has been selected as the priority pump, the excitation of relay R1 by proper closing of switch 53 causes excitation of relay R3 insuring, by the closing of contacts 21–22, the excitation of relay PA(−). Excitation of relay PA(−) will cause the closing of contacts 51 and 52 and will result in the starting of pump PA in the (−) direction.

Referring jointly to FIGS. 1 and 2, pump PA(−) being supposed in service, when the pressure level corresponding to point M is detected by device MO, the contacts 7–10 and 7–27 of device MO will close causing the closing of relay R1 and the excitation of relay RT 1. Excitation of relay RT 1 will, by means of relay RP B(−) cause the closing of contacts 50–51; whereby power will be supplied to motor MB of pump PB causing PB to start in the (−) direction. After a predetermined time, if the pressure corresponding to point M is no longer detected by device MO, the contacts of the device will open and, via the action of relay R2, the pump PB will be stopped and the PA(−) mode of operation resumed.

However, if the pressure corresponding to point M is detected, the PA(−) + PB(−) operational mode continues until the pressure corresponding to point P is reached.

When the pressure corresponding to point P of FIG. 1 is detected by switch PR1, switch PR1 causes the excitation of relay RT 2. Excitation of RT 2 causes, via the excitation of relay RP A(+), the starting of pump PA in the (+) direction. Excitation of RT 2 also causes, by means of relay R2, contacts 21–22 and 24–25 to open thus shutting down pump PB(−). After a predetermined time, if the pressure corresponding to P is not detected, relay RT 2 is deenergized causing the PA(−) + PB(−) mode of operation to resume. If, on the other hand, pressure P is detected the PA(+) operational mode continues until the pressure corresponding to point R is reached.

When pressure R is detected by switch PR2, the contacts of this switch close causing the excitation of RT 3 whereby pump PB is started in the (+) direction. If, after a further predetermined time delay, the pressure S is detected by PR2, the mode of operation PA(+) + PB(+) continues until a pressure level corresponding to point K of FIG. 1 is reached. If, however, the pressure falls below level R, the contacts of switch PR2 open causing relay RT 2 to be deenergized and, by means of relay R3, the motor MB of pump PB to be stopped.

It is to be noted that switches 54 and 55 are controlled by thermo-magnetic relays, not shown, which act as safety devices to guard against overloading or unbalance of the pump drive motors. Also, indicator lights 56 and 57 are provided. Control equipment for a stand-by pump may be connected in parallel with the indicator lights. A number of push button type switches MF, MF PR$_1$, MF PR$_2$ have been shown. These push button type switches serve solely for control of the installation manually when the automatic control is out of service or for operation of the priority pump at a reduced level.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. In a fluid distribution system including a fluid source and a fluid distribution circuit the improvement comprising:
    booster pump means, said pump means including at least a first motor-pump group, said motor-pump group comprising a centrifugal pump controlled by a reversible motor and connected between the source and distribution circuit; and
    means for selectively controlling said motor for rotation in a first direction to provide a first flow rate and in the second direction to provide a second flow rate in response to a predetermined variation of flow in the distribution circuit.

2. The apparatus of claim 1 further comprising:
    at least a second motor-pump group, said second motor-pump group comprising a second centrifugal pump controlled by a second reversible motor; and
    means connecting said second pump in parallel with said first pump, said second motor being controlled by said controlling means to rotate in a first direction to cause said second pump to provide a first flow rate and in a second direction to cause said second pump to provide a second flow rate in response to predetermined variations of flow in the distribution circuit.

3. The apparatus of claim 2 wherein said first and second pumps have the same operating characteristics and said controlling means includes means for operating said motors separately or simultaneously.

4. The apparatus of claim 3 wherein said controlling means comprises:
    pressure responsive transducer means for sensing the output pressure of each pump; and
    relay means responsive to said transducer means for individually controlling the energization and direction of rotation of each of said motors.

5. The apparatus of claim 4 wherein said relay means comprises:
switch means for energizing said first motor for rotation in said first direction; and
means responsive to the sensing of a first pressure level for energizing said second motor for rotation in a first direction commensurate with the lower of the two output flow rates of said second pump, said second pump thereby rotating in parallel with said first pump.

6. The apparatus of claim 5 further comprising:
means responsive to the sensing of a second pressure level less than said first level for deenergizing said first and second motors and reenergizing said first motor for rotation in said second direction.

7. The apparatus of claim 6 wherein said means responsive to the sensing of said second pressure level comprises:
second time delay relay means.

8. The apparatus of claim 7 wherein said means responsive to the sensing of said first pressure level comprises:
first time delay relay means.

* * * * *